United States Patent [19]

Chelminski

[11] 3,800,907
[45] Apr. 2, 1974

[54] DISPLACEABLE DIAPHRAGM STRUCTURES FOR USE IN SEISMIC IMPULSE TRANSMISSION

[75] Inventor: Stephen V. Chelminski, West Reading, Conn.

[73] Assignee: Bolt Associates, Inc., Norwalk, Conn.

[22] Filed: July 31, 1972

[21] Appl. No.: 276,883

Related U.S. Application Data

[63] Continuation of Ser. No. 888,759, Dec. 29, 1969, abandoned.

[52] U.S. Cl............ 181/.5 EC, 181/.5 VM, 340/17
[51] Int. Cl............................................. G01v 1/14
[58] Field of Search........ 181/.5 VM, .5 RC; 340/17

[56] References Cited
UNITED STATES PATENTS

| | | | |
|---|---|---|---|
| 3,310,128 | 3/1967 | Chelminski | 181/.5 VM |
| 3,480,102 | 11/1969 | Kilmer | 181/.5 H |
| 3,368,642 | 2/1968 | Kilmer | 181/.5 RC |
| 3,403,748 | 10/1968 | Tabor | 181/.5 RC |

Primary Examiner—Maynard R. Wilbur
Assistant Examiner—N. Moskowitz
Attorney, Agent, or Firm—Bryan, Parmelee, Johnson & Bollinger

[57] ABSTRACT

Improved diaphragm structures are described wherein a movable metal or composite diaphragm is used to couple and transmit an intense acoustical seismic impulse into the medium below. The displaceable diaphragm is positioned and slideably attached at the bottom of a closed tank containing a substantially incompressible transmitting liquid such as water. Above the diaphragm and inside of the tank is positioned one or more devices for abruptly releasing pressurized gas, such as a high pressure repeatable gas releasing airgun. When the airgun is "fired" it releases a sudden powerful blast of pressurized gas, the powerful impulse from it is transmitted through the water in the tank to the diaphragm which moves downwardly and in turn transmits the seismic energy impulse into the sound conducting medium below, which may be land, marshland, mud, swamp, sand, water, gravel, rock, etc. The diaphragm may be used to repeatably transmit such seismic impulses into the earth by repeatably firing the airgun device within the fluid filled tank.

2 Claims, 4 Drawing Figures

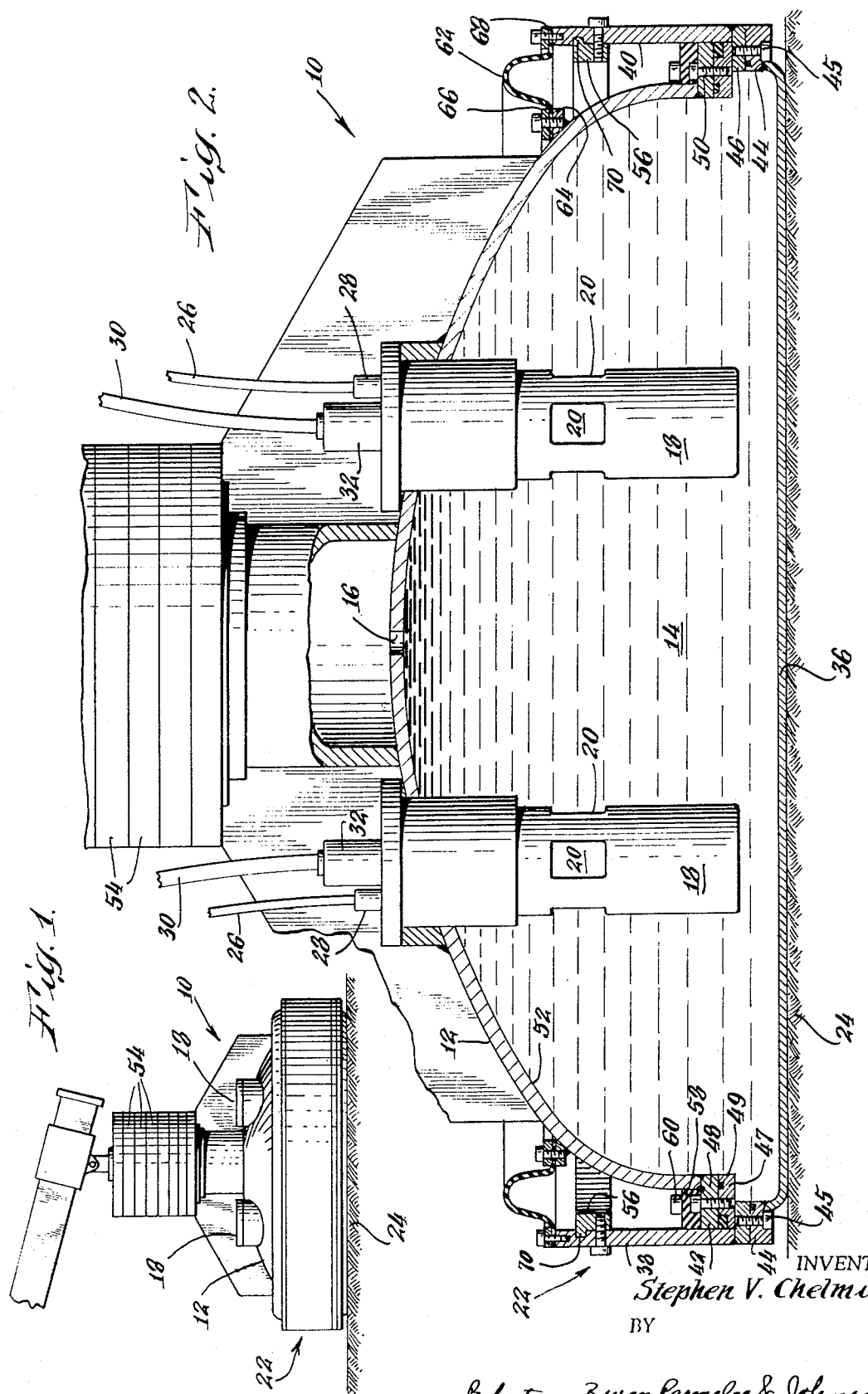

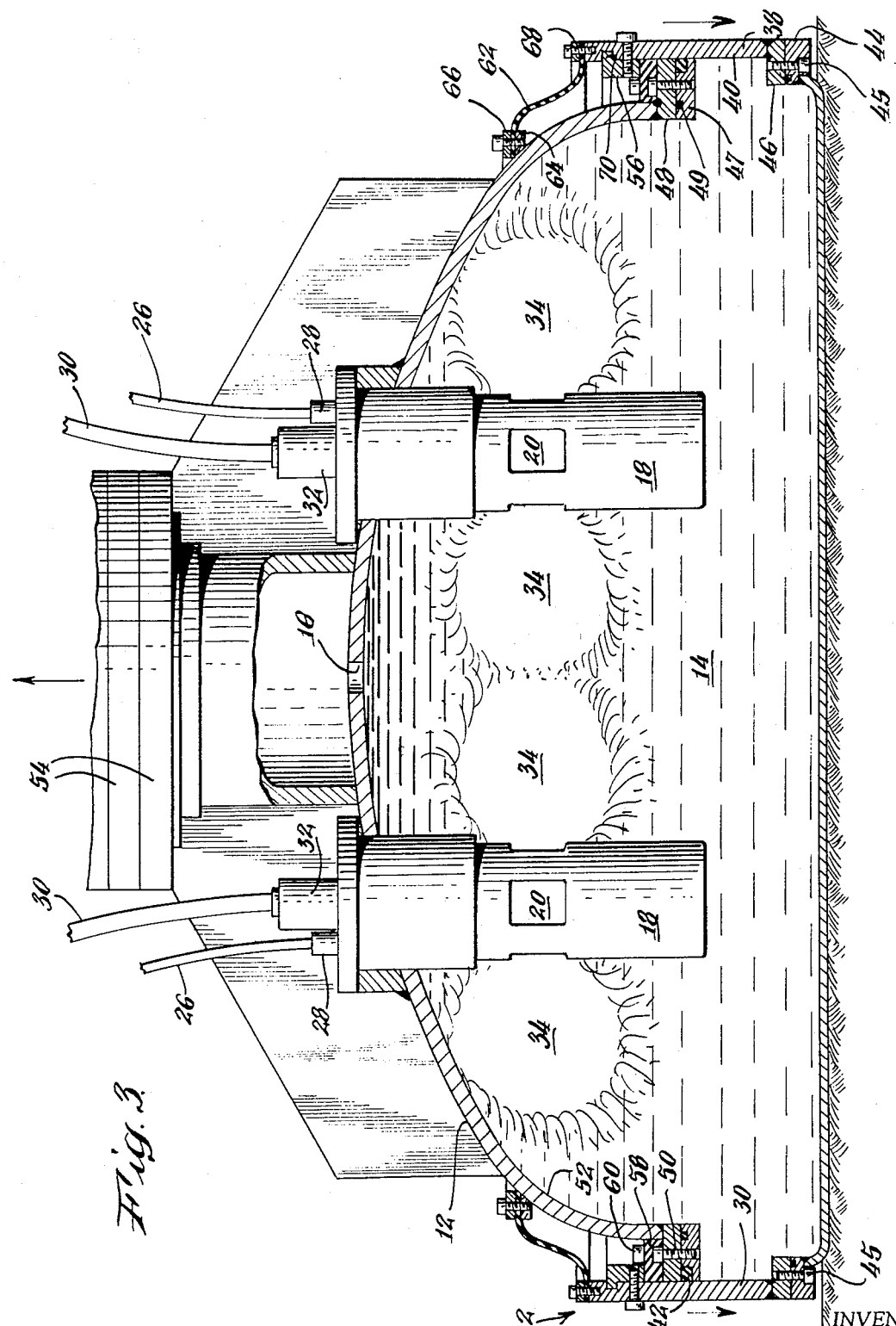

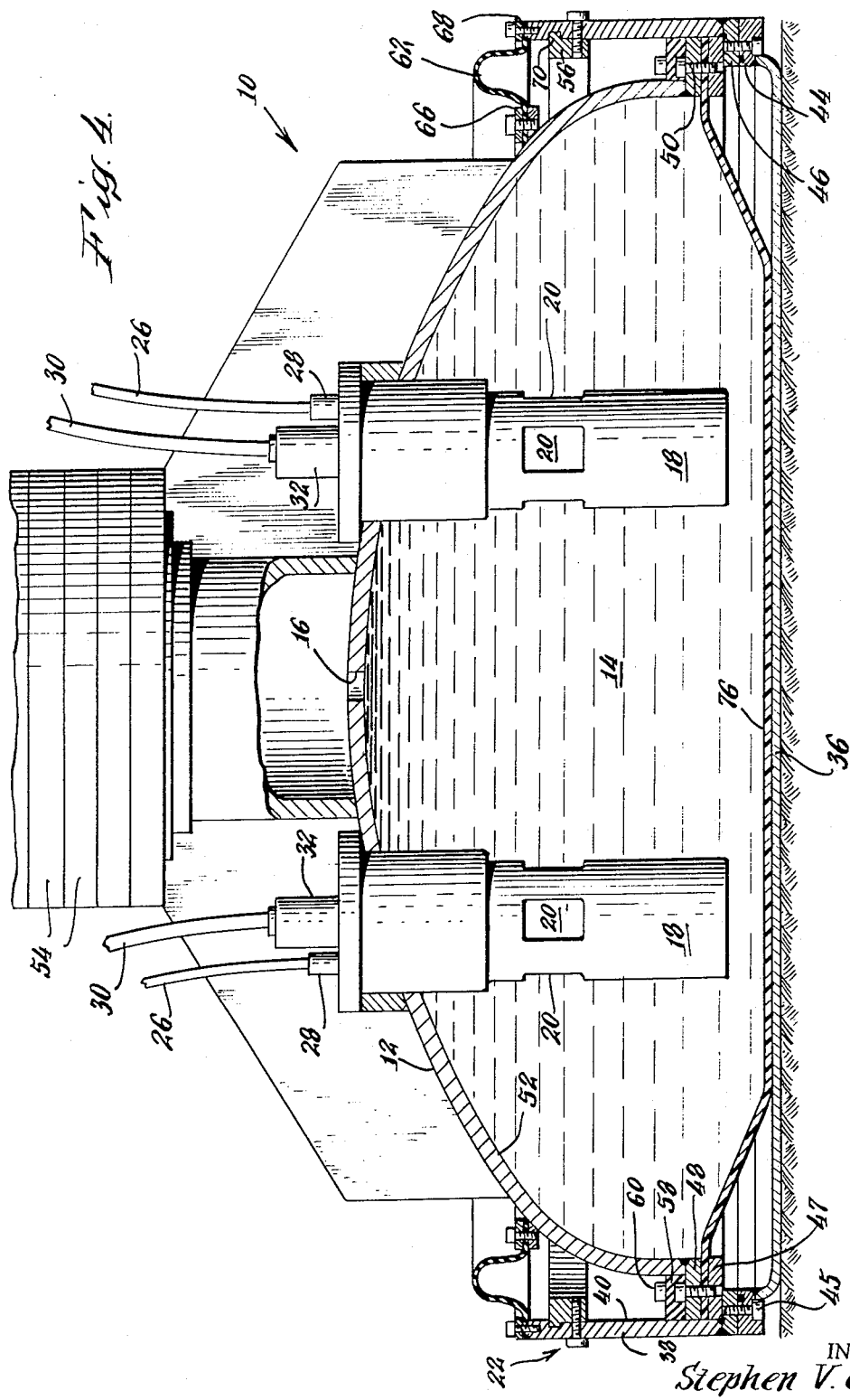

DISPLACEABLE DIAPHRAGM STRUCTURES FOR USE IN SEISMIC IMPULSE TRANSMISSION

This is a continuation, of application Ser. No. 888,759 filed Dec. 29, 1969, now abandoned.

This invention relates to improved diaphragm structures for use on seismic sound sources for seismic surveying on land, ground, gravel, rocks, marshland, mud, sand, swamps or on water. More specifically, the invention relates to metal or composite diaphragms for transmitting the powerful energy impulse pulse from seismic sound sources such as described and claimed in my copending patent application, Ser. No. 851,268, filed Aug. 19, 1969, and in U.S. Pat. No. 3,310,128, dated Mar. 21, 1967.

A sound source of this type comprises a tank with a displaceable diaphragm bottom containing substantially incompressible liquid, such as water, in which is immersed one or more powerful gas releasing airguns. The airguns receive and store air or other suitable gas under high pressure, for example, at 2,000 pounds per square inch, from a source of pressurized gas such as the receiver storage tank of a high pressure air compressor. Upon a signal from the operator, during a seismic survey, the airguns may be "fired" thus causing the airguns to explosively release the stored high pressure gas into the liquid in the tank in which they are immersed. The pressure produced by this explosive release of high pressure air into the energy transmitting liquid causes the rigid diaphragm at the bottom of the tank to be abruptly moved downwardly, displacing the portion of the earth beneath it, thus producing a seismic pulse in the earth.

As used herein, the word "earth" is intended to include all of the many various types of terrain on which the displaceable diaphragm may be used, including land, ground, gravel, rocks, marshland, mud, sand, swamps and bodies of water such as lakes, rivers, sounds, seas, etc.

It is an object of this invention to provide an improved durable displaceable metal or composite seismic impulse transmitting diaphragm having a long life.

It is another object of this invention to provide an improved displaceable seismic impulse transmitting diaphragm the outside diameter of which is the largest diameter of the sound source system, whereby the weight of the sound source system is distributed along the diaphragm so that the sound source system may readily follow the diaphragm into the depression or hole in the earth made by the compacting action of this diaphragm on the earth.

It is a further object of this invention to provide an improved displaceable seismic impulse transmitting diaphragm for use directly on the earth without the need for previous preparation of the earth's surface.

FIG. 1 illustrates a side view of the sound source system including an arm connecting the same to a vehicle.

FIG. 2 illustrates an elevational sectional view of an embodiment of all metal diaphragm structure.

FIG. 3 illustrates an elevational sectional view of the embodiment of FIG. 2 being fired.

FIG. 4 shows an elevational sectional view of a modified embodiment of the diaphragm structure.

With reference to FIG. 1 and 2 a movable seismic wave generator system 10 embodying the present invention includes a closed dome-shaped tank 12 having a rigid curved side and top wall. The tank is concentric about an upright axis of symmetry. The tank 12 contains a substantially non-compressible liquid 14, such as water, in confined relationship. At the center of the top of the dome-tank 12 is an outlet port 16 through which the released gases are allowed to escape from the tank 12. Connected to the outlet port 16 is gas-liquid separation apparatus, as shown in my copending application Ser. No. 851,268, filed on Aug. 19, 1969, escape for separating the released gases from the liquid so that the liquid is conserved to be returned to the interior of the tank 12 and the released gases can excape to the atmosphere. This copending application discloses in detail and claims the seismic wave generator system, and if the reader is interested in further details of such systems he may wish to refer thereto.

Mounted within the liquid 14 near the bottom of the tank 12 are three acoustical airgun repeaters 18 (only two can be seen in the Figures) similar to those abrupt gas releasing repeaters shown in the U.S. Pat. No. 3,310,128, and which are sometimes referred to as "airguns." Each of these airgun repeaters 18 includes discharge ports 20, and the purpose of these airgun repeaters is to repetitively abruptly release a large quantity of high pressure gas through the discharge ports 20 into the liquid to generate powerful impulses which are transmitted by displaceable diaphragm structure 22 into he earth 24. In this preferred embodiment of the present invention the pressurized gas which is abruptly released with explosivelike suddenness through the discharge ports 20 is compressed air.

In operation, the compressed air is delivered through high pressure air lines 26 to an input connection 28 into the airguns 18. The high pressure air is stored in the airguns 18 awaiting an electrical control signal from the operator which is sent through the electric cables 30, calling firing lines, to trigger solenoid-operated high pressure air valves 32 which fire the airguns 18. When the airguns 18 are fired, there suddenly issued from their ports 20 a blast 34 of high pressure air into the liquid, see FIG. 3. This blast 34 pressurizes the liquid 14 transmitting a sudden pressure impulse to a metal diaphragm plate 36 of the diaphragm structure 22.

As shown in FIG. 3, in response to this sudden pressurization the metal diaphragm plate 36 flexes downward and the diaphragm structure 22 is displaced downwardly and abruptly pressurizes the earth 24 beneath it thus sending down into the earth 24 a powerful seismic impulse or waves. These powerful vibrations are capable of deep penetration into the earth for seismic surveying purposes. The downward displacement of the diaphragm structure 22 is accommodated by an outer movable cylinder 38 whose inner surface 40 provides a sliding seal with an annual seal member 42 of suitable plastic material, such as plastic seal material of polyurethane.

A mounting ring 44 is welded to the periphery of the metal diaphragm disc 36. This mounting ring 44 is secured by machine screws 45 to an inwardly projecting flange 46 that is welded to the bottom of the movable cylinder 38.

The polyurethane seal 42 is held by a clamping ring 47 that clamps the seal 42 against a flange 48 which is welded to the lower rim of the dome-shaped tank 12. Another inner liquid-retaining plastic seal 49 in a groove is also clamped between the clamping ring 47 and the flange 48, he clamping ring being fastened by machine screws 50.

The pressure of the blast of high pressure gas 34 into the liquid 14 also acts against the inner surface 52 of the tank assembly 12 and even though the tank assembly 12 and all that is attached to it, including weights 54, is much heavier than the diaphragm structure 22, the tank 12 rises upwardly while the metal diaphragm plate 36 is pressurizing the earth 24 beneath it. As the tank 12 rises upward the seal 42 slides up along the seal surface 40 until a stroke-limiting stop element or annular stop ring 56 bumps a shock-absorbing bumper or annular shock-absorbing ring 58. The shock-absorbing bumper 58 is of suitable resilient material, such as resilient polyurethane. It compresses under the load applied by the stroke-limiting stop 56. Since the tank assembly 12 has considerable upward momentum, the downward motion of the diaphragm structure 22 is reversed, when the bumper 58 hits the stop 56, lifting the diaphragm structure 22 off from the earth, thus ending direct sound coupling of the seismic impulse signal transmission into the earth.

After upward motion of the diaphragm structure 22 is attained the tank assembly 12 and diaphragm structure 22 continue to move upwardly for some additional distance until gravity stops their upward motion. The tank diaphragm assembly is prevented from falling directly onto the earth by the catching system of the vehicle which transports and supports the sound source system, as described in the copending application Ser. No. 851,268 filed Aug. 19, 1969. As the tank falls back under control of the catching system air goes to the top of the tank and vents out through a port 16 leading to an air liquid separation baffle system opening to the atmosphere. The bottom of the diaphragm structure 22 contacts the ground first; next, the diaphragm structure 22 retracts relative to sound source system so that when the unit settles down, it is ready to be fired again.

The resilient bumper 58 is secured to the top of the tank flange 48 by a series of stud bolts 60.

For the purpose of keeping dirt away from the sliding surface 40, there is a slack annular flexible rubber boot 62 which extends around the tank 12 and which extends between the top of the cylinder 38 and the outside of the tank. The inner edge of the flexible boot 62 is clamped between a ledge 64 welded on the outside of the tank 12 and a clamp ring 66. The outer edge of the flexible boot 62 is clamped to the top edge of the cylinder 38 by a clamp ring 68. To prevent the stop 56 from shifting it has a lip 70 which projects into a groove in the wall of the cylinder 38.

In the modified embodiment shown in FIG. 4, there is an inner flexible resilient diaphragm 76 of tough flexible material, such as polyurethane extending across the bottom of the tank 12. The perimeter of this diaphragm 76 is clamped onto the tank flange 48 by a clamp ring 78. This diaphragm 76 stretches and flexes when the diaphragm plate 36 is displaced downwardly.

Comparing FIG. 4 with FIGS. 2 and 3, it is seen that the sliding seal 42, seal clamp 47, and the seal 49 can be omitted when the inner flexible diaphragm 76 is used.

It should be understood that various modifications may be made in the present invention by those skilled in the art without departing from the spirit or scope of the present invention as defined in the description and appended claims.

I claim:

1. A seismic energy source for surveying on the earth by transmitting seismic energy impulses into the earth and being of the type having a closed dome-shaped tank with a igid curved side and top wall containing a substantilly incompressible liquid with at least one air gun for abruptly releasing pressurized gas into the liquid in the dome-shaped tank, wherein the invention comprises independently movable apparatus coupling the tank to the earth for transmitting powerful seismic impulses into the earth including a tank flange extending outwardly around the lower rim of the dome-shaped tank, a resilient flexible diaphragm of tough flexible material such as polyurethane extending across the bottom of said tank, the perimeter of said diaphragm being clamped to said tank flange for sealing the incompressible liquid within the tank, an outer freely movable cylinder surrounding the tank and extending upwardly around the tank, said outer movable cylinder being spaced outwardly from the periphery of the tank with the tank being freely movable upwardly for a distance with respect to said movable cylinder from a first lower rest position, to a second elevated position spaced from the lower rest position, a metal diaphragm plate extending across under the bottom of the tank beneath said resilient flexible diaphragm, said metal diaphragm plate being adapted to rest down upon the earth and having its perimeter secured to the bottom of said movable cylinder to form therewith a cup-shaped structure in which said tank rests and having a diameter larger than said tank with said movable cylinder being spaced outwardly beyond the periphery of the tank and surrounding the tank for distributing the weight of the seismic source on the earth over a metal diaphragm plate larger than the diameter of the seismic source, whereby upon firing of the air gun to abruptly release pressurized gas into the liquid, the flexible resilient diaphragm and the metal diaphragm plate can be displaced freely downwardly and the tank can rise freely within said outer cylinder between said rest and elevated positions, thereby maintaining said metal diaphragm plate in contact with the earth as the tank rises, for transmitting a powerful seismic impulse into the earth.

2. A seismic energy source for surveying the earth as claimed in claim 1, in which a slack annular flexible rubber boot extends between the top of said freely movable cylinder and the exterior of said dome-shaped tank for keeping dirt away from the space between the outside of the tank and the interior surface of said freely movable cylinder.

* * * * *